(12) United States Patent
Shirasaki et al.

(10) Patent No.: US 10,616,424 B2
(45) Date of Patent: Apr. 7, 2020

(54) IMAGE FORMING APPARATUS

(71) Applicant: KYOCERA Document Solutions Inc., Osaka (JP)

(72) Inventors: Seiichi Shirasaki, Osaka (JP); Kazuhisa Iwamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/259,485

(22) Filed: Jan. 28, 2019

(65) Prior Publication Data

US 2019/0238694 A1    Aug. 1, 2019

(30) Foreign Application Priority Data

Jan. 31, 2018 (JP) .................................. 2018-014870

(51) Int. Cl.
*H04N 1/00* (2006.01)

(52) U.S. Cl.
CPC ....... *H04N 1/00384* (2013.01); *H04N 1/0032* (2013.01); *H04N 1/0049* (2013.01)

(58) Field of Classification Search
CPC . H04N 1/00384; H04N 1/0032; H04N 1/0049
USPC ....................................................... 358/1.13
See application file for complete search history.

(56) References Cited

U.S. PATENT DOCUMENTS

2009/0060617 A1*  3/2009  Ogushi .................. B65H 31/38
                                                    399/407

FOREIGN PATENT DOCUMENTS

JP      2000-127574 A      5/2000

* cited by examiner

*Primary Examiner* — Saeid Ebrahimi Dehkordy
(74) *Attorney, Agent, or Firm* — Studebaker & Brackett PC

(57) ABSTRACT

An image forming apparatus includes a main body and a post-processing device. The main body includes an operation panel and a first controller that switches an action mode to a first action mode or a second action mode. The post-processing device includes an operation receiving section and a second controller. The operation receiving section receives an operation by a user and outputs an operation signal. The operation receiving section is in an unreachable position for the user when operating the operation panel. The first controller switches the action mode upon determining that an operation indicated by the operation signal received through the second controller matches a predetermined operation. The second controller controls action of the post-processing device independent of control by the first controller in the second action mode.

14 Claims, 13 Drawing Sheets

| Action mode / Operation key | Normal action mode | 1st maintenance mode |
|---|---|---|
| 1st operation key | Stapling position switching process | Driving section switching process |
| 2nd operation key | Manual stapling performance process | Test driving process |

FIG. 10

| Sensor group | Sensor | 1st lamp | 2nd lamp | 3rd lamp | 4th lamp |
|---|---|---|---|---|---|
| 1st group | 1st sensor |  |  | O |  |
|  | 2nd sensor |  | O |  |  |
|  | 3rd sensor |  | O | O |  |
|  | 4th sensor | O |  |  |  |
|  | 5th sensor | O |  | O |  |
|  | 6th sensor | O | O |  |  |
| 2nd group | 7th sensor |  |  | O | O |
|  | 8th sensor |  | O |  | O |
|  | 9th sensor |  | O | O | O |
|  | 10th sensor | O |  |  | O |
|  | 11th sensor | O |  | O | O |
|  | 12th sensor | O | O |  | O |
|  | 13th sensor | O | O | O | O |
| 3rd group | 14th sensor |  |  | O | (1) |
|  | 15th sensor |  | O |  | (1) |
|  | 16th sensor |  | O | O | (1) |
|  | 17th sensor | O |  |  | (1) |
|  | 18th sensor | O |  | O | (1) |
|  | 19th sensor | O | O |  | (1) |
| 4th group | 20th sensor |  |  | O | (2) |
|  | 21th sensor |  |  |  | (2) |
|  | 22th sensor |  | O | O | (2) |
|  | 23th sensor | O | O |  | (2) |
|  | 24th sensor | O |  | O | (2) |
|  | 25th sensor | O | O |  | (2) |

FIG. 11

| Adjustment item | 1st lamp | 2nd lamp | 3rd lamp | 4th lamp |
|---|---|---|---|---|
| 1st adjustment item | | | | △ |
| 2nd adjustment item | | | △ | |
| 3rd adjustment item | | | △ | △ |
| 4th adjustment item | | △ | | |
| 5th adjustment item | | △ | | △ |
| 6th adjustment item | | △ | △ | |
| 7th adjustment item | | △ | △ | △ |
| 8th adjustment item | △ | | | |
| 9th adjustment item | △ | | | △ |
| 10th adjustment item | △ | | △ | |

FIG. 12

| Operation key \ Operation | Long press operation | Single press operation |
|---|---|---|
| 1st operation key | — | Candidate setting value switching process |
| 2nd operation key | Adjustment item switching process | Setting value registration process |

FIG. 13

IMAGE FORMING APPARATUS

INCORPORATION BY REFERENCE

The present application claims priority under 35 U.S.C. § 119 to Japanese Patent Application No. 2018-014870, filed on Jan. 31, 2018. The contents of this application are incorporated herein by reference in their entirety.

BACKGROUND

The present disclosure relates to an image forming apparatus.

An image forming apparatus that simplifies maintenance work has been disclosed. A worker performs adjustment work on the image forming apparatus by operating an operation section.

An image forming apparatus has also been disclosed in which a post-processing device connects to a main body through an optional device such as a binding processing device.

SUMMARY

An image forming apparatus according to an aspect of the present disclosure includes a main body and a post-processing device connected to the main body. The main body includes an operation panel and a first controller. The operation panel receives an operation by a user. The first controller switches an action mode to either a first action mode or a second action mode differing from the first action mode. The post-processing device includes a casing, a post-processing section, an operation receiving section, and a second controller. The post-processing section performs post processing on a sheet. The operation receiving section is located on the casing and outputs an operation signal indicating the operation by the user. The second controller controls action of the post-processing device based on control by the first controller in the first action mode. The operation receiving section is in an unreachable position for the user when operating the operation panel. The second controller transmits the operation signal to the first controller upon receiving the operation signal. The first controller determines whether or not the operation indicated by the operation signal matches a predetermined operation. The first controller switches the action mode upon determining that the operation indicated by the operation signal matches the predetermined operation. The second controller controls action of the post-processing device independent of the control by the first controller in the second action mode.

BRIEF DESCRIPTION OF THE DRAWINGS

FIG. 10 is a diagram illustrating processes assigned to a first operation key and a second operation key according to the second embodiment of the present disclosure.

FIG. 11 is a diagram illustrating a relationship between states of a notification section and a plurality of sensors according to a third embodiment of the present disclosure.

FIG. 12 is a diagram illustrating a relationship between states of a notification section and a plurality of adjustment items in a first notification mode according to a fourth embodiment of the present disclosure.

FIG. 13 is a diagram illustrating processes assigned to a first operation key and a second operation key according to the fourth embodiment of the present disclosure.

DETAILED DESCRIPTION

Figure 1:
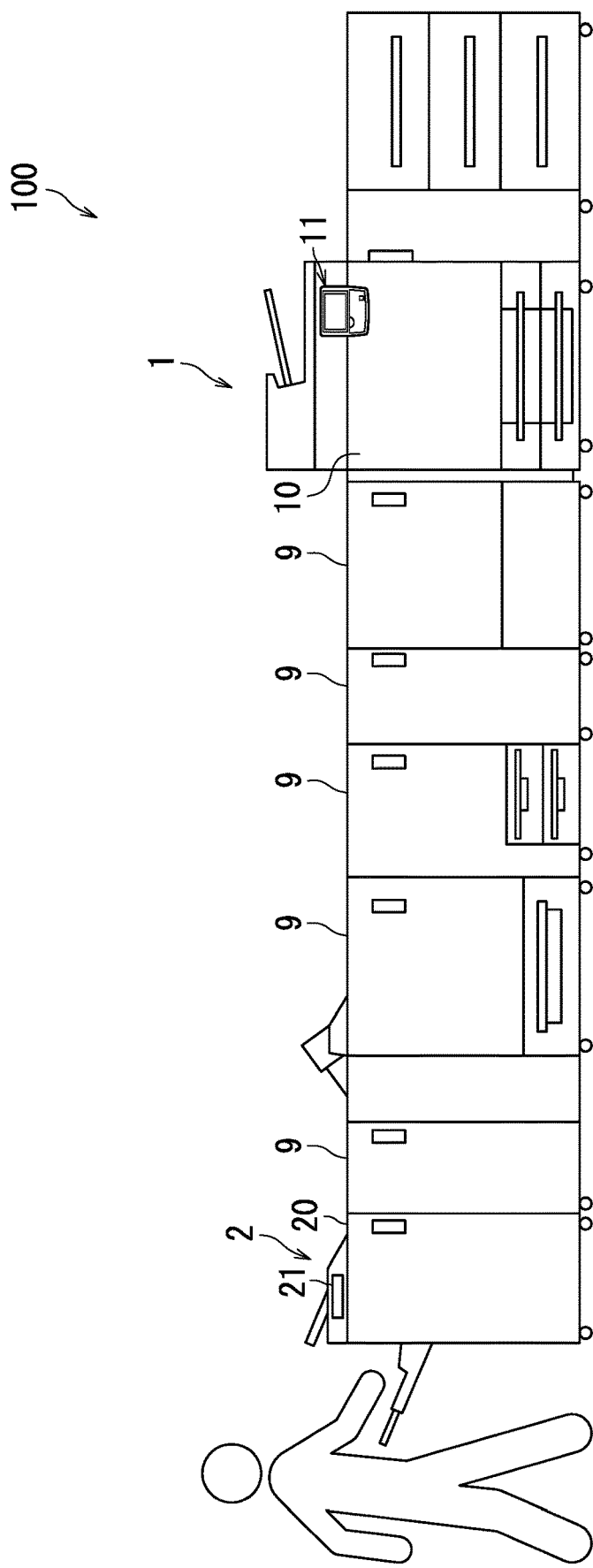
FIG. 1 is a diagram illustrating a configuration of an image forming apparatus according to a first embodiment of the present disclosure.

The following describes embodiments of an image forming apparatus according to the present disclosure with reference to the accompanying drawings. Note that elements that are the same or equivalent are labelled with the same reference signs in the drawings and description thereof is not repeated.

First Embodiment

The following describes a configuration of an image forming apparatus 100 according to a first embodiment with reference to FIG. 1. FIG. 1 is a diagram illustrating the configuration of the image forming apparatus 100 according to the first embodiment.

As illustrated in FIG. 1, the image forming apparatus 100 includes a main body 1 and a post-processing device 2. The post-processing device 2 connects to the main body 1 through a plurality of optional devices 9. The optional devices 9 are binding processing devices, for example.

The main body 1 forms an image on a sheet. The main body 1 includes a first casing 10 and a first operation panel 11. The first operation panel 11 receives an operation by a user (instruction from a user). Upon receiving the operation by the user, the first operation panel 11 outputs a first operation signal indicating the operation by the user. The first operation panel 11 is located on a side of the first casing 10.

The post-processing device 2 performs post-processing on the sheet with the image formed thereon by the main body 1. Examples of the post-processing include punching processing, shifting processing, and stapling processing.

The post-processing device 2 includes a second casing 20 and a second operation panel 21. The second casing 20 is located apart from the first casing 10. A distance between the first casing 10 and the second casing 20 is 4 m, for example. The second casing 20 is an example of a casing.

The second operation panel 21 receives an operation by the user (instruction from the user for the post-processing device 2) and outputs a second operation signal indicating the operation by the user. The second operation panel 21 is located on a side of the second casing 20. The second operation panel 21 is in an unreachable position for the user when operating the first operation panel 11.

Figure 2:
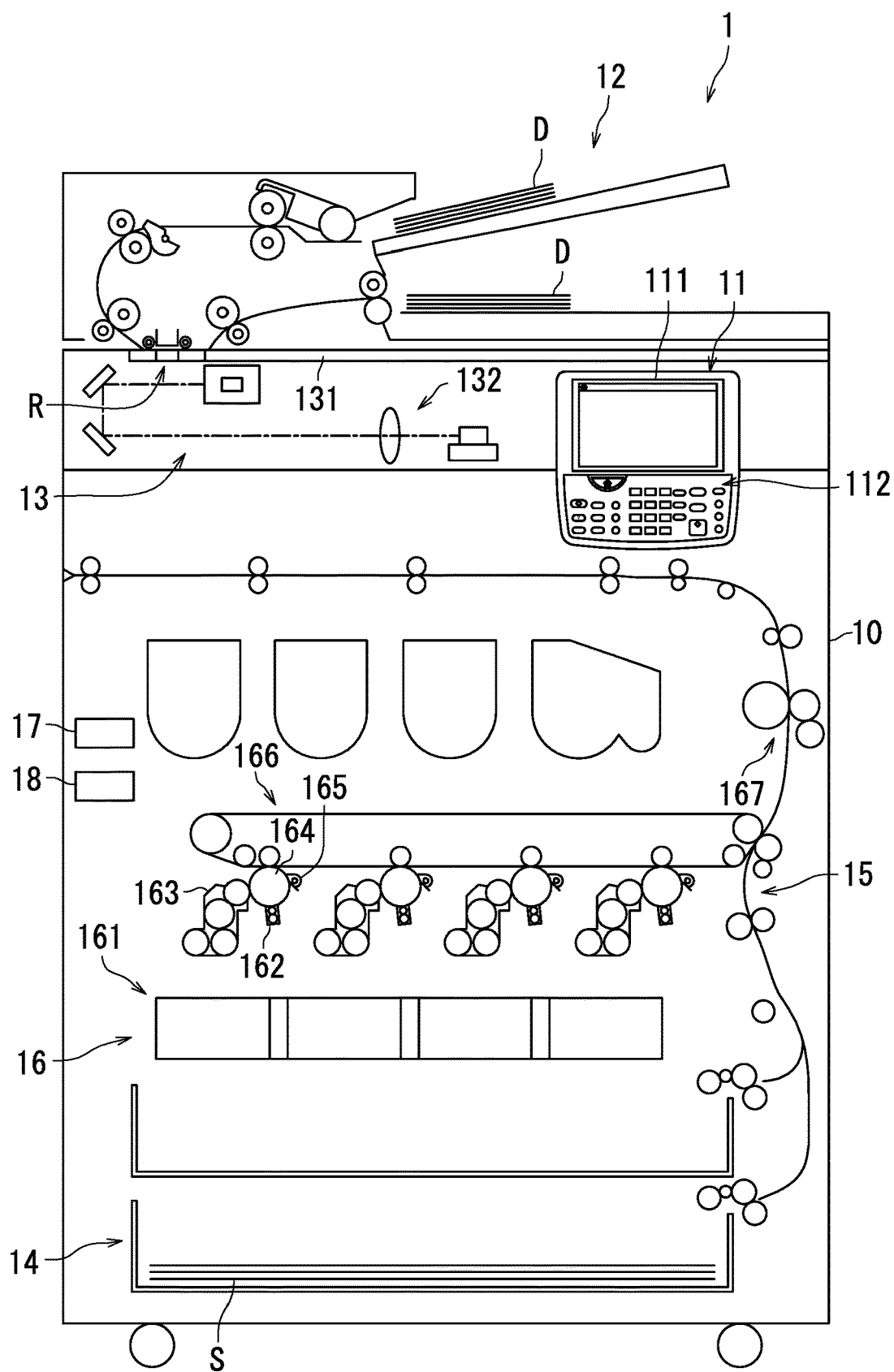
FIG. 2 is a diagram illustrating a configuration of a main body according to the first embodiment of the present disclosure.

The following describes a configuration of the main body 1 according to the first embodiment with reference to FIGS. 1 and 2. FIG. 2 is a diagram illustrating the configuration of the main body 1 according to the first embodiment.

As illustrated in FIG. 2, the main body 1 includes a document conveyor device 12, a document reading device 13, a sheet feed section 14, a first conveyor mechanism 15, an image forming section 16, first storage 17, and a first controller 18 in addition to the first casing 10 and the first operation panel 11.

The first operation panel 11 includes a touch display 111 and a plurality of keys 112.

The touch display 111 includes a display and a touch sensor. The display displays various screens. The display is a liquid-crystal display or an organic electroluminescent (EL) display, for example. The touch sensor detects a touch by a detected object. The touch sensor outputs a touch signal indicating a position in which the touch by the detected object is detected. The detected object is a finger of the user, for example. The touch sensor is a resistive film method touch sensor, for example. The keys 112 include a numeric keypad, a start key, and a cancel key.

The document conveyor device 12 performs a document conveyance process to convey an original document D. The document conveyor device 12 includes a document loading tray, a document conveyance section, and a document exit tray. The document conveyance section conveys an original document D loaded on the document loading tray a sheet at a time to the document exit tray by way of a reading position R. The reading position R is a position in which the document reading device 13 can read an image from the original document D.

The document reading device 13 reads an image from the original document D to generate document image data indicating the image of the original document D. In the following, a process of reading the image of the original document D and generating the document image data is referred to as a "document reading process". The document reading device 13 includes contact glass 131 and a reading mechanism 132. The reading mechanism 132 includes a light source, a carriage, an optical system, and a charge-coupled device (CCD) image sensor. The reading mechanism 132 reads the image of the original document D loaded on the contact glass 131 and outputs original image data. Alternatively, the document reading device 13 reads the image of the original document D passing the reading position R and outputs original image data. The document reading device 13 is a scanner, for example.

The sheet feed section 14 performs a feeding process to feed a sheet S. In detail, the sheet feed section 14 includes a sheet feed cassette and a sheet feed roller group. The sheet feed cassette houses a plurality of sheets S. The sheet feed roller group feeds the sheets S housed in the sheet feed cassette a sheet at a time. The sheets S are paper, for example.

The first conveyor mechanism 15 performs a first conveyance process to convey a sheet S from the sheet feed section 14 to an exterior of the first casing 10. The sheet S is conveyed through the image forming section 16. The first conveyor mechanism 15 includes rollers and guide members.

The image forming section 16 performs an image formation process to form an image on the sheet S. According to the present embodiment, the image forming section 16 includes an exposure device 161, a charger 162, a development device 163, a photosensitive drum 164, a cleaning device 165, a transfer device 166, and a fixing device 167, and forms an image electrographically. The exposure device 161 forms an electrostatic latent image on the photosensitive drum 164 based on image data. The charger 162 uniformly charges the photosensitive drum 164 to a predetermined potential. The development device 163 supplies toner to the photosensitive drum 164 to develop the electrostatic latent image formed on the photosensitive drum 164. The fixing device 167 fixes to the sheet S a toner image transferred to the sheet S.

The first storage 17 stores various data therein. The first storage 17 includes a storage device and semiconductor memory. The storage device includes either or both of a hard disk drive (HDD) and a solid-state drive (SSD), for example. The semiconductor memory includes random-access memory (RAM) and read-only memory (ROM), for example. The first storage 17 stores a first control program therein.

The first controller 18 controls action of each section of the image forming apparatus 100 by executing the first control program. The first controller 18 includes a processor such as a central processing unit (CPU). The first controller 18 also includes an integrated circuit for image formation processing. The integrated circuit for image formation processing includes an application-specific integrated circuit (ASIC), for example.

The first controller 18 switches an action mode of the image forming apparatus 100 between a normal action mode and a maintenance mode. The first controller 18 stores a first action mode flag indicating the action mode of the image forming apparatus 100 in the first storage 17. The first action mode flag indicates whether the action mode of the image forming apparatus 100 is the normal action mode or the maintenance mode. According to the present embodiment, the first action mode flag indicates "ON" when the action mode of the image forming apparatus 100 is the normal action mode. By contrast, the first action mode flag indicates "OFF" when the action mode of the image forming apparatus 100 is the maintenance mode. Note that the normal action mode is an example of a first action mode and the maintenance mode is an example of a second action mode.

In the normal action mode, the main body 1 performs a process of forming an image on the sheet S. In the maintenance mode, the main body 1 performs a maintenance process. The maintenance process includes a process of adjusting a control value of each section, for example. The control value is for example a voltage value applied to a development roller included in the development device 163.

The following describes a configuration of the post-processing device 2 according to the first embodiment with reference to FIGS. 1 and 3 to 7.

Figure 3:
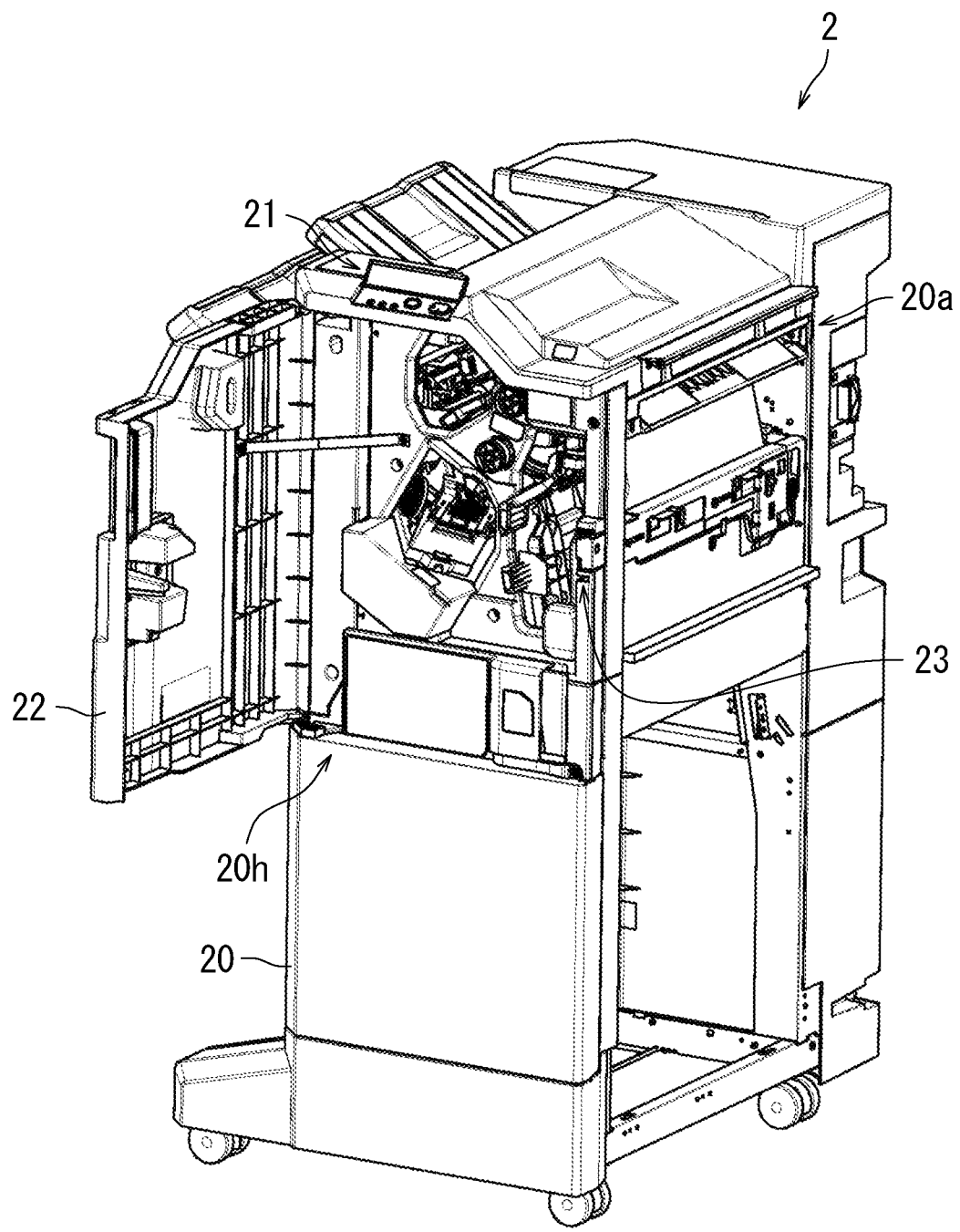
FIG. 3 is a perspective view of an external configuration of a post-processing device according to the first embodiment of the present disclosure.
Figure 4:
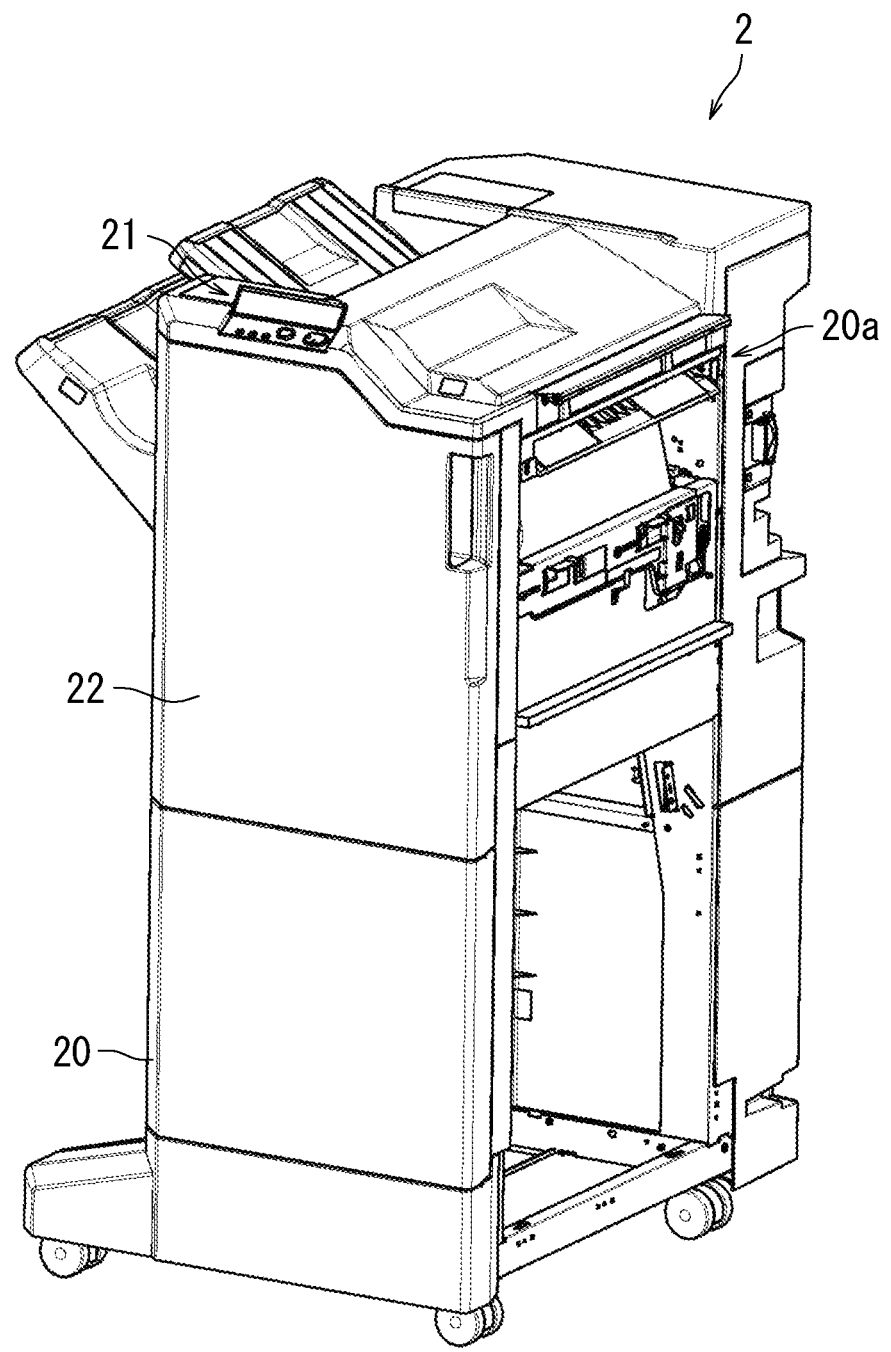
FIG. 4 is another perspective view of the external configuration of the post-processing device according to the first embodiment of the present disclosure.

First, an external configuration of the post-processing device 2 according to the first embodiment is described with reference to FIGS. 1, 3, and 4. FIG. 3 is a perspective view of the external configuration of the post-processing device 2 according to the first embodiment. FIG. 4 is another perspective view of the external configuration of the post-processing device 2 according to the first embodiment.

As illustrated in FIG. 3, the post-processing device 2 further includes a cover member 22 and an opening and closing detection section 23. The opening and closing detection section 23 includes a sensor such as a thru-beam sensor, for example. The cover member 22 and the opening and closing detection section 23 are located on the second casing 20. In other words, the cover member 22 and the opening and closing detection section 23 are in a position that is unreachable for the user when operating the first operation panel 11. According to the present embodiment, the second operation panel 21, the cover member 22, and the opening and closing detection section 23 constitute an operation receiving section.

As illustrated in FIGS. 3 and 4, the cover member 22 is supported by the second casing 20 to freely open and close, and receives opening and closing operation by the user. When the cover member 22 is in an open posture, an opening 20h included in the second casing 20 is open. When the cover member 22 is in a closed posture by contrast, the opening 20h included in the second casing 20 is covered by the cover member 22.

The opening and closing detection section 23 outputs an opening and closing detection signal indicating whether the cover member 22 is in the open posture or the closed posture. According to the present embodiment, the opening and closing detection signal and the second operation signal (refer to FIG. 1) constitute an operation signal.

Figure 5:
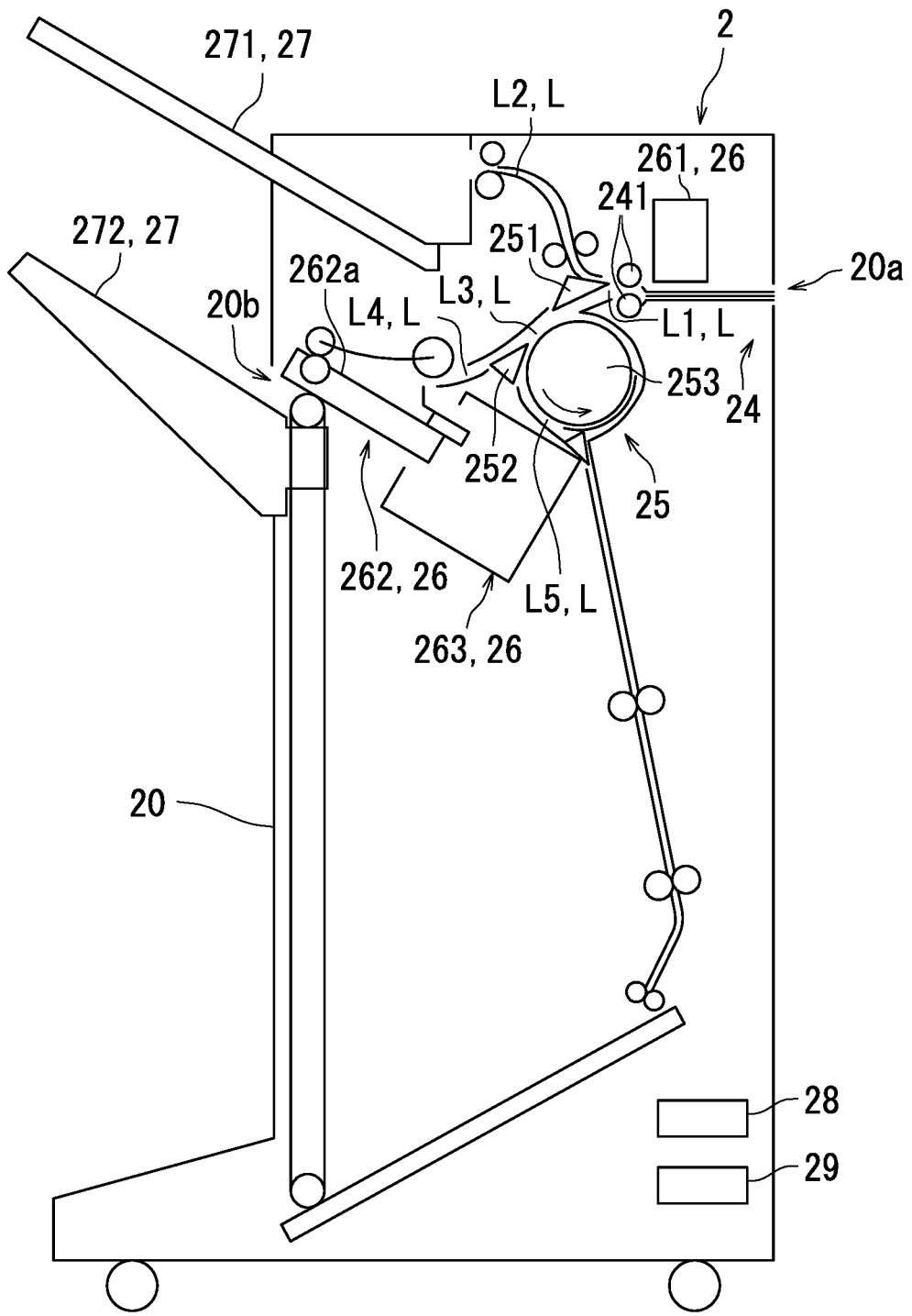
FIG. 5 is a diagram illustrating an internal configuration of the post-processing device according to the first embodiment of the present disclosure.

The following describes an internal configuration of the post-processing device 2 according to the first embodiment with reference to FIGS. 1 and 3 to 6. FIG. 5 is a diagram illustrating the internal configuration of the post-processing device 2 according to the first embodiment.

As illustrated in FIG. 5, the post-processing device 2 further includes an intake section 24, a second conveyance mechanism 25, a post-processing section 26, an exit tray 27, a second storage 28, and a second controller 29. The intake section 24, the second conveyance mechanism 25, the post-processing section 26, the second storage 28, and the second controller 29 are located inside of the second casing 20. The second storage 28 is an example of storage.

The post-processing section 26 includes a puncher 261, a processor 262, and a stapler 263.

The sheet S is conveyed through a first intake port 20a in the intake section 24. The first intake port 20a is provided on a side of the second casing 20. The sheet S is conveyed from the first casing 10 to the first intake port 20a through the optional devices 9 (refer to FIG. 1).

The intake section 24 includes intake rollers 241. The intake rollers 241 convey a sheet S taken in from the first intake port 20a to the second conveyance mechanism 25.

The second conveyance mechanism 25 includes rollers and guide members. The second conveyance mechanism 25 performs a second conveyance process to convey the sheet S taken into the intake section 24 to the exit tray 27. According to the present embodiment, the exit tray 27 includes a first exit tray 271 and a second exit tray 272. The second conveyance mechanism 25 conveys the sheet S to the first exit tray 271 or the second exit tray 272. In detail, the second conveyance mechanism 25 conveys a sheet S that is not the target of a predetermined process toward the first exit tray 271. The second conveyance mechanism 25 conveys a sheet S that is the target of the predetermined process toward the second exit tray 272. The predetermined process is for example either or both of the shifting processing by the processor 262 and the stapling processing by the stapler 263.

The second conveyance mechanism 25 includes a plurality of rollers, a plurality of guide members, a first diverging member 251, a second diverging member 252, and a holding roller 253, and constitutes a post-processing conveyance path L. The post-processing conveyance path L includes a first post-processing conveyance path L1, a second post-processing conveyance path L2, a third post-processing conveyance path L3, a fourth post-processing conveyance path L4, and a holding conveyance path L5.

The first post-processing conveyance path L1 extends from the intake section 24 to the first diverging member 251. The second post-processing conveyance path L2 extends from the first diverging member 251 to the first exit tray 271. The third post-processing conveyance path L3 extends from the first diverging member 251 to the second diverging member 252. The fourth post-processing conveyance path L4 extends from the second diverging member 252 to the second exit tray 272. The holding conveyance path L5 extends along a peripheral surface of the holding roller 253.

The first diverging member 251 and the second diverging member 252 each switch a conveyance destination of the sheet S by pivoting. In detail, the first diverging member 251 switches the conveyance destination of the sheet S conveyed along the first post-processing conveyance path L1 between the second post-processing conveyance path L2 and the third post-processing conveyance path L3. The sheet S to be ejected to the first exit tray 271 is conveyed along the second post-processing conveyance path L2. The sheet S to be conveyed to the fourth post-processing conveyance path L4 or the holding conveyance path L5 is conveyed along the third post-processing conveyance path L3. The second diverging member 252 switches the conveyance destination of the sheet S conveyed along the third post-processing conveyance path L3 between the fourth post-processing conveyance path L4 and the holding conveyance path L5. The sheet S to be conveyed to the processor 262 is conveyed along the fourth post-processing conveyance path L4. A sheet S requiring control of conveyance timing to the processor 262 is conveyed along the holding conveyance path L5. The sheet S conveyed along the holding conveyance path L5 is wrapped around the holding roller 253, and conveyance timing thereof to the processor 262 is controlled.

The puncher 261 performs punching processing on the sheet S conveyed from the first intake port 20a.

The processor 262 performs alignment processing and shifting processing. The processor 262 includes a processing tray 262a, an alignment plate, a sheet feed guide, a shifting guide, a shifting plate, and a paddle.

The sheet S is stacked on the processing tray 262a. According to the present embodiment, the sheet S taken in from the first intake port 20a is stacked on the processing tray 262a. Alternatively, a sheaf of sheets S stacked on the second exit tray 272 is taken in from a second intake port 20b and stacked on the processing tray 262a. According to the following embodiment, a stapler 263 side (side opposite from the second intake port 20b) of the sheet S (sheaf of sheets S) stacked on the processing tray 262a is described as a "back side of the sheet S", and a side opposite thereto is described as a "front side of the sheet S". Also according to the embodiment, a side on the left of the sheet S stacked on the processing tray 262a when viewed from the front side is described as a "left side of the sheet S", and a side opposite thereto is described as a "right side of the sheet S".

The stapler 263 performs the stapling processing. The stapling processing includes automatic stapling processing and manual stapling processing. The user can for example specify the automatic stapling processing or the manual stapling processing by operating the first operation panel 11.

In the automatic stapling processing, a sheaf of sheets S sequentially conveyed from the first intake port 20a to the processing tray 262a is stapled. The stapler 263 staples the sheaf of sheets S when the sheets S are stacked on the processing tray 262a. The stapled sheaf of sheets S is conveyed to the second exit tray 272 by the second conveyance mechanism 25.

In the manual stapling processing by contrast, a sheaf of sheets S inserted by the user is conveyed from the second intake port 20b to the processing tray 262a. The stapler 263 staples the sheaf of sheets S at a stapling position specified by the user. The stapled sheaf of sheets S is conveyed by the second conveyance mechanism 25 to the second exit tray 272.

The stapling position is specified by the user operating the second operation panel 21. According to the present embodiment, the user specifies a first stapling position, a second stapling position, or a third stapling position as the stapling position.

When the first stapling position is specified as the stapling position, the stapler 263 staples the sheaf of sheets S at two points: a back left and a back right thereof. When the second stapling position is specified as the stapling position, the stapler 263 staples the sheaf of sheets S at one point: the back right thereof. When the third stapling position is specified as the stapling position, the stapler 263 staples the sheaf of sheets S at one point: the back left thereof. Note that a standby position of the stapler 263 differs depending on the first stapling position, the second stapling position, and the third stapling position.

Stapling position information indicating the stapling position specified by the user is stored in the second storage 28.

The second storage 28 stores various data therein. The second storage 28 includes semiconductor memory. The semiconductor memory includes RAM and ROM, for example.

The second storage 28 stores a second action mode flag therein. The second action mode flag indicates whether the action mode of the image forming apparatus 100 is the normal action mode or the maintenance mode. According to the present embodiment, the second action mode flag indicates "ON" when the action mode of the image forming apparatus 100 is the normal action mode. By contrast, the second action mode flag indicates "OFF" when the action mode of the image forming apparatus 100 is the maintenance mode.

The second storage 28 also stores therein a setting value for each of a plurality of adjustment items. The adjustment items include adjustment items related to the post-processing performed by the post-processing section 26. For example, the adjustment items include adjustment items related to a home position of the stapler 263.

The second storage 28 stores therein a second control program which controls action of each section of the post-processing device 2.

The second controller 29 controls action of each section of the post-processing device 2 by executing the second control program. The second controller 29 also receives signals output by each section of the post-processing device 2. According to the present embodiment, the second controller 29 receives at least one of the second operation signal and the opening and closing detection signal. When the post-processing device 2 is connected to the first casing 10, the second controller 29 can communicate with the first controller 18. The second controller 29 for example performs communication with the first controller 18 through a serial communication method.

According to the present embodiment, the second controller 29 transmits a signal received from any section of the post-processing device 2 to the first controller 18 upon receiving the signal from the section of the post-processing device 2 when the action mode of the image forming apparatus 100 is the normal action mode. Upon receiving the signal from the section of the post-processing device 2 through the second controller 29, the first controller 18 transmits an instruction signal which controls action of any section of the post-processing device 2. In other words, the second controller 29 controls action of each section of the post-processing device 2 based on the control of the first controller 18 when the action mode of the image forming apparatus 100 is the normal action mode.

Figure 6:
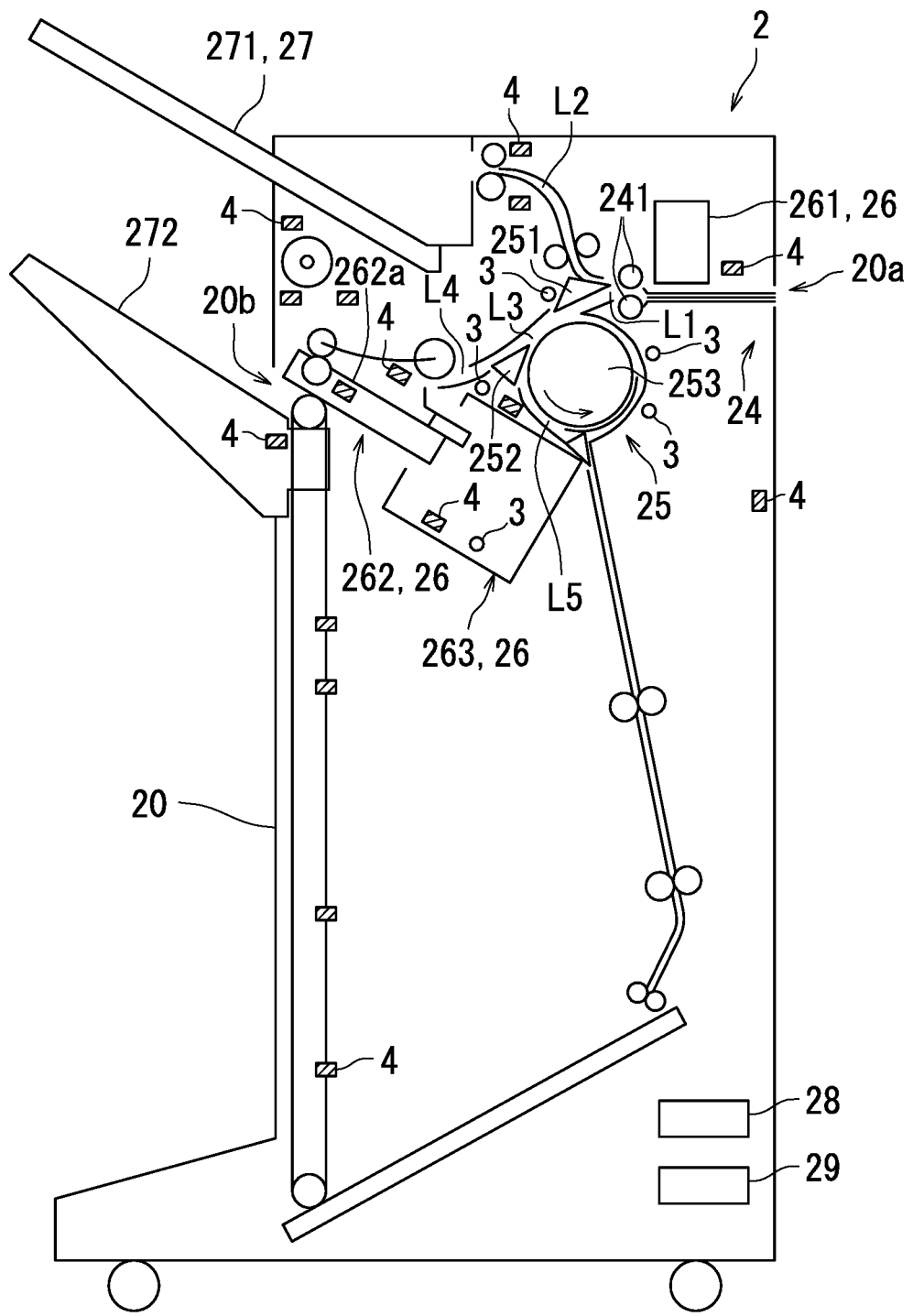
FIG. 6 is a diagram illustrating a plurality of driving sections and a plurality of sensors according to the first embodiment of the present disclosure.

The following further describes the internal configuration of the post-processing device 2 according to the first embodiment with reference to FIG. 6. FIG. 6 is a diagram illustrating a plurality of driving sections 3 and a plurality of sensors 4 according to the first embodiment.

As illustrated in FIG. 6, the post-processing device 2 further includes the plurality of driving sections 3 and the plurality of sensors 4. The driving sections 3 are located inside of the second casing 20.

The driving sections 3 drive each section of the second conveyance mechanism 25 and the post-processing section 26. The driving sections 3 include motors, for example. The driving sections 3 move the stapler 263, for example.

The sensors 4 detect the presence and position of a detection object. The sensors 4 are located in the second conveyance mechanism 25 and the post-processing section 26. The detection object is a sheet, for example. Each sensor 4 is a thru-beam sensor, for example.

Figure 7:
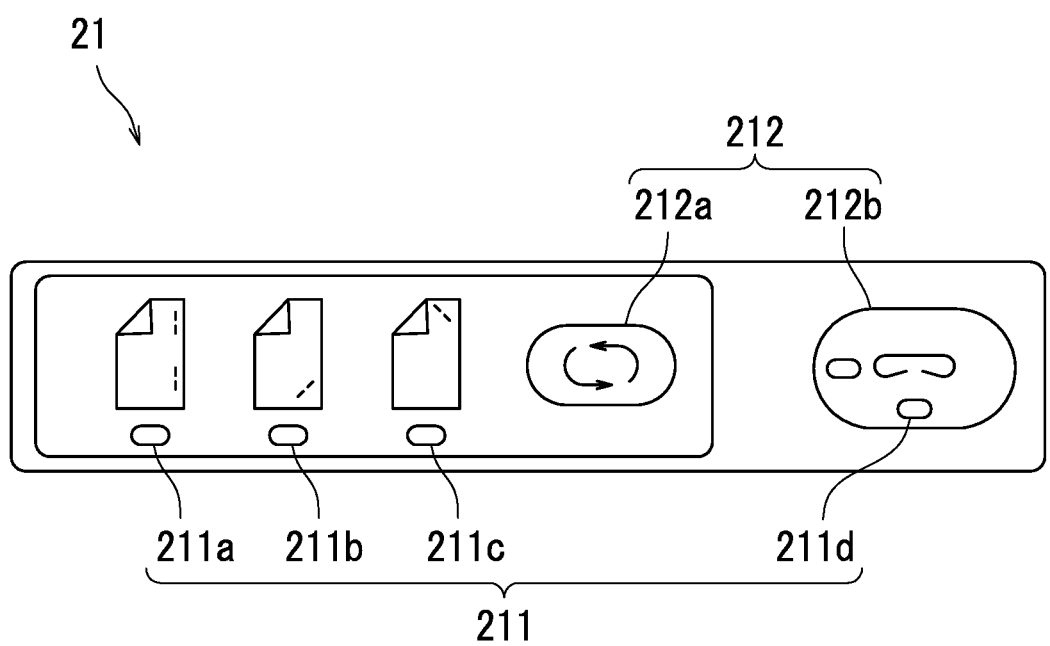
FIG. 7 is a diagram illustrating an example of a second operation panel according to the first embodiment of the present disclosure.

The following describes the second operation panel 21 according to the first embodiment with reference to FIGS. 1 and 3 to 7. FIG. 7 is a diagram illustrating an example of the second operation panel 21 according to the first embodiment.

As illustrated in FIG. 7, the second operation panel 21 includes a notification section 211 and an operation key section 212.

The notification section 211 notifies of information related to the post-processing device 2. The information related to the post-processing device 2 is for example setting information related to the post-processing such as the stapling position (refer to FIG. 5).

The notification section 211 includes four lamps: 211a, 211b, 211c, and 211d. The four lamps 211a, 211b, 211c, and 211d, are light-emitting diodes (LED), for example. In the following, the four lamps 211a, 211b, 211c, and 211d are respectively referred to as a "first lamp 211a", a "second lamp 211b", a "third lamp 211c", and a "fourth lamp 211d".

According to the present embodiment, the first lamp 211a, the second lamp 211b, and the third lamp 211c notify of the stapling position information. Specifically, the first lamp 211a is illuminated and the second lamp 211b and the third lamp 211c are unilluminated when the first stapling position is specified as the stapling position. The second lamp 211b is illuminated and the first lamp 211a and the third lamp 211c are unilluminated when the second stapling position is specified as the stapling position. The third lamp 211c is illuminated and the first lamp 211a and the second lamp 211b are unilluminated when the third stapling position is specified as the stapling position.

The fourth lamp 211d for example notifies of information indicating whether the stapling processing can be performed. The fourth lamp 211d is illuminated when the stapling processing can be performed and is unilluminated when the stapling processing cannot be performed.

The operation key section 212 includes two operation keys: 212a and 212b. In the following, the two operation keys are respectively referred to as a "first operation key 212a" and a "second operation key 212b".

When the first operation key 212a is pressed, a first key press signal is transmitted to the second controller 29. When the second operation key 212b is pressed, a second key press signal is transmitted to the second controller 29.

A stapling position switching process is assigned to the first operation key 212a. The stapling position switching process means a process of switching the stapling position described with reference to FIG. 5.

Upon the user pressing the first operation key 212a, the first key press signal is transmitted to the first controller 18 through the second controller 29. Upon receiving the first key press signal, the first controller 18 switches the action mode to the manual stapling mode. In detail, the first controller 18 prohibits conveyance of a sheet S to the post-processing device 2 and transmits a first instruction signal to the second controller 29 which causes the second controller 29 to perform the stapling position switching process.

Upon receiving the first instruction signal, the second controller 29 performs the stapling position switching process. In detail, the second controller 29 changes the stapling position information stored in the second storage 28. In the following, changing the stapling position information stored in the second storage 28 is referred to as "switching the stapling position". According to the present embodiment, the second controller 29 switches the stapling position in the following sequence: the first stapling position, the second stapling position, the third stapling position, and then the first stapling position once more. Upon switching the stapling position, the second controller 29 causes the driving sections 3 to drive, thus changing the standby position of the stapler 263.

A manual stapling performance process is assigned to the second operation key 212b. The manual stapling performance process means a process to cause the stapler 263 described with reference to FIG. 5 to perform the manual stapling processing.

Upon the user pressing the second operation key 212b, the second key press signal is transmitted to the first controller 18 through the second controller 29. Upon receiving the second key press signal from the second controller 29, the first controller 18 transmits a second instruction signal to the second controller 29 which causes the second controller 29 to perform the manual stapling performance process.

Upon receiving the second instruction signal, the second controller 29 causes the stapler 263 to perform the manual stapling processing.

According to the present embodiment, the first controller 18 determines whether or not an operation indicated by a signal received from the second controller 29 is a predetermined operation. The predetermined operation is for example an operation of opening and closing the cover member 22 once in a state where the first operation key 212a and the second operation key 212b are simultaneously pressed. The first controller 18 performs an action mode switching process upon determining that the operation indicated by the signal received from the second controller 29 indicates the operation of opening and closing the cover member 22 once in the state where the first operation key 212a and the second operation key 212b are pressed simultaneously. The action mode switching process means a process of switching the action mode of the image forming apparatus 100. In detail, the action mode switching process means a process of switching the operation mode of the image forming apparatus 100 from the normal action mode to the maintenance mode. Alternatively, the action mode switching process means a process of switching the action mode of the image forming apparatus 100 from the maintenance mode to the normal action mode.

According to the present embodiment, the second controller 29 determines whether or not a signal received from any section of the post-processing device 2 indicates the predetermined operation when the action mode of the image forming apparatus 100 is the maintenance mode. The second controller 29 transmits a signal received from a section of the post-processing device 2 to the first controller 18 only when determining that the signal from the section of the post-processing device 2 is a signal indicating the predetermined operation in a case where the action mode of the image forming apparatus 100 is the maintenance mode. Upon determining that a signal received from a section of the post-processing device 2 is not a signal indicating the predetermined operation by contrast, the second controller 29 does not transmit the signal received from the section of the post-processing device 2 to the first controller 18. In other words, the second controller 29 controls action of each section of the post-processing device 2 independent of the control of the first controller 18 when the action mode of the image forming apparatus 100 is the maintenance mode.

Figure 8:
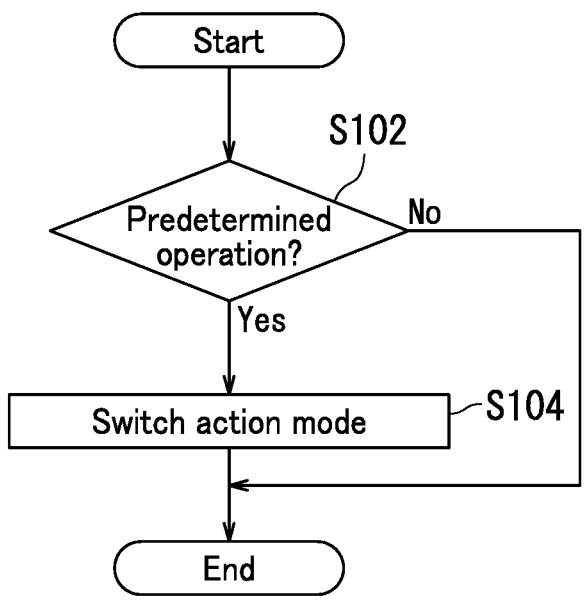
FIG. 8 is a flowchart illustrating an action mode switching process according to the first embodiment of the present disclosure.

The following describes the action mode switching process according to the first embodiment with reference to FIGS. 1 to 8. FIG. 8 is a flowchart illustrating the action mode switching process according to the first embodiment. The action mode switching process starts upon the first controller 18 receiving the second operation signal.

As illustrated in FIG. 8, the first controller 18 determines whether or not an operation indicated by a signal received from the second controller 29 matches the predetermined operation (Step S102). Upon determining that the operation indicated by the signal received from the second controller 29 matches the predetermined operation (Step S102: Yes), the first controller 18 switches the action mode (Step S104) and ends the action mode switching process. In detail, the first controller 18 switches the first action mode flag (refer to FIG. 2) and the second action mode flag (refer to FIG. 5) from ON to OFF when switching the action mode from the normal action mode to the maintenance mode. By contrast, the first controller 18 switches the first action mode flag and the second action mode flag from OFF to ON when switching the action mode from the maintenance mode to the normal action mode.

The first controller 18 does not switch the action mode when determining that the operation indicated by the signal received from the second controller 29 does not match the predetermined operation (Step S102: No) and ends the action mode switching process.

The first embodiment is described above. According to the present embodiment, a worker can switch the action mode of the image forming apparatus 100 merely by opening and closing the cover member 22 once in the state where the first operation key 212a and the second operation key 212b are pressed simultaneously even when the post-processing device 2 is located apart from the main body 1. In other words, the worker need not travel back and forth between the first operation panel 11 and the second operation panel 21 to switch the action mode of the image forming apparatus 100. As a result, work efficiency increases. Alternatively, the number of workers needed to perform maintenance work can be reduced.

According to the present embodiment, an example is described in which the predetermined operation is an operation of opening and closing the cover member 22 once in the state where the first operation key 212a and the second operation key 212b are pressed simultaneously. However, the predetermined operation may be any operation which can prohibit the action mode of the image forming apparatus 100 from switching against the intention of the worker or the user. For example, the predetermined operation may be an operation of opening and closing the cover member 22 once in a state where at least one of the first operation key 212a and the second operation key 212b is long-pressed. Alternatively, the predetermined operation may be an operation of opening and closing the cover member 22 at least twice in the state where the first operation key 212a and the second operation key 212b are pressed simultaneously.

Also according to the present embodiment, the manual stapling performance process is assigned to the second operation key 212b in the normal action mode. However, the process assigned to the second operation key 212b in the normal action mode may be any process of performing the post-processing. For example, the process may be a process to specify a timing at which the puncher 261 punches a hole in a sheet S.

According to the present embodiment, the stapling position switching process is assigned to the first operation key 212a in the normal action mode. However, the process assigned to the first operation key 212a in the normal action mode may be any process of switching settings related to the post-processing. For example, the process may be a process of switching a position of a hole to be punched in a sheet S by the puncher 261.

According to the present embodiment, a configuration is described in which the first operation panel 11 includes the touch display 111 and the keys 112. However, the first operation panel 11 may exclude the keys 112.

Second Embodiment

The following describes an image forming apparatus 100 according to a second embodiment with reference to FIGS. 1 to 7, 9, and 10. The second embodiment differs from the first embodiment in that the action mode of the image forming apparatus 100 is a first maintenance mode. In the following, points of difference between the second and first embodiments are described, and description of elements that the embodiments share is omitted.

According to the present embodiment, a maintenance mode includes the first maintenance mode. The first maintenance mode is a mode in which a worker examines whether or not driving sections 3 included in a post-processing device 2 are acting normally.

Figure 9:
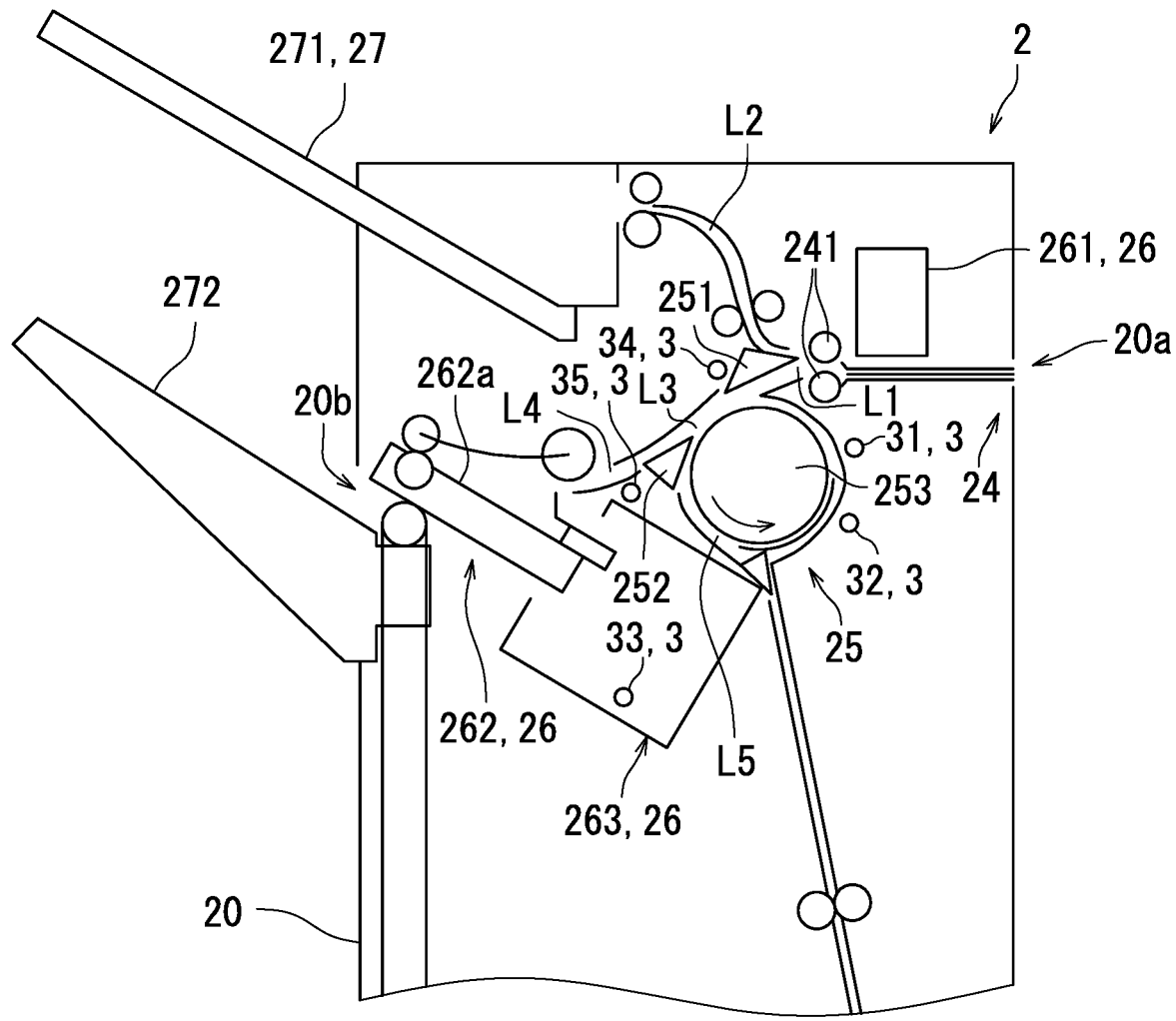
FIG. 9 is a diagram illustrating a configuration of a post-processing device according to a second embodiment of the present disclosure.

First, a configuration of the post-processing device 2 according to the second embodiment is described with reference to FIG. 9. FIG. 9 is a diagram illustrating the configuration of the post-processing device 2 according to the second embodiment.

As illustrated in FIG. 9, the driving sections 3 include a first driving section 31, a second driving section 32, a third driving section 33, a fourth driving section 34, and a fifth driving section 35. According to the present embodiment, the first driving section 31 is an "intake drive mechanism", the second driving section 32 is a "holding roller drive mechanism", the third driving section 33 is a "stapling drive mechanism", the fourth driving section 34 is a "first diverging member drive mechanism", and the fifth driving section 35 is a "second diverging member drive mechanism". The intake drive mechanism, the holding roller drive mechanism, and the stapling drive mechanism are motors, for example. The first diverging member drive mechanism and the second diverging member drive mechanism are solenoids, for example.

Action of the driving sections 3 differs according to the action mode of the image forming apparatus 100. In detail, the driving sections 3 drive normally when the action mode of the image forming apparatus 100 is a normal action mode. Driving normally means driving for the post-processing device 2 to perform post-processing. For example, the intake drive mechanism rotates intake rollers 241 to take a sheet S into a second casing 20. The holding roller drive mechanism rotates a holding roller 253 to wrap the sheet S around the holding roller 253. The stapling drive mechanism moves a stapler 263 to a stapling position. The first diverging member drive mechanism and the second diverging member drive mechanism respectively pivot a first diverging member 251 and a second diverging member 252 to switch a conveyance destination of the sheet S.

By contrast, the driving sections 3 test drive when the action mode of the image forming apparatus 100 is the first maintenance mode. Test driving means driving to examine whether or not the driving sections 3 are acting normally. For example, the stapling drive mechanism is examined to determine whether or not the stapler 263 can move normally in a driving range. The driving range means a range in which the stapler 263 can move. By visually confirming the action of the stapler 263, for example, the worker can discover either or both of a fault and damage to a sensor 4.

Processes assigned to a first operation key 212a and a second operation key 212b change according to the action mode of the image forming apparatus 100. When the action mode switches from the normal action mode to the first maintenance mode, processes required in the first maintenance mode are assigned to the first operation key 212a and the second operation key 212b.

The following describes the processes assigned to the first operation key 212a and the second operation key 212b according to the second embodiment with reference to FIG. 10. FIG. 10 is a diagram illustrating the processes assigned to the first operation key 212a and the second operation key 212b according to the second embodiment.

As illustrated in FIG. 10, a stapling position switching process is assigned to the first operation key 212a when the action mode of the image forming apparatus 100 is the normal action mode (refer to FIG. 7). By contrast, a driving section switching process is assigned to the first operation key 212a when the action mode of the image forming apparatus 100 is the first maintenance mode. In detail, a second controller 29 receives a first key press signal upon the worker pressing the first operation key 212a when the action mode of the image forming apparatus 100 is the first maintenance mode. Upon receiving the first key press signal, the second controller 29 performs the driving section switching process. The driving section switching process means a process of switching a test target driving section 3. The test target driving section 3 is a driving section 3 that is a target for performance of test driving. According to the present embodiment, the second controller 29 switches the test target driving section 3 each time the first key press signal is received (each time the first operation key 212a is single-pressed) in the following sequence: the first driving section 31, the second driving section 32, the third driving section 33, the fourth driving section 34, the fifth driving section 35, and then the first driving section 31 once more.

A manual stapling performance process is assigned to the second operation key 212b when the action mode of the image forming apparatus 100 is the normal action mode (refer to FIG. 7). By contrast, a test driving process is assigned to the second operation key 212b when the action mode of the image forming apparatus 100 is the first maintenance mode. In detail, the second controller 29 receives a second key press signal upon the worker pressing the second operation key 212b. Upon receiving the second key press signal, the second controller 29 performs the test driving process. The test driving process means a process of test driving the test target driving section 3. Note that upon receiving the second key press signal during the test driving process, the second controller 29 ends the test driving process.

The second embodiment is described above. According to the present embodiment, the process to be performed when an operation key section 212 (first operation key 212a and second operation key 212b) is pressed changes according to the action mode of the image forming apparatus 100. The processes required in the first maintenance mode are assigned to the first operation key 212a and the second operation key 212b when the action mode of the image forming apparatus 100 switches from the normal action mode to the first maintenance mode. Accordingly, work efficiency of maintenance work increases.

Note that according to the present embodiment, the test driving process is described as beginning (being performed) when the second operation key 212b is pressed and ending when the second operation key 212b is pressed during the test driving. However, the test driving process may for example continue while the second operation key 212b is pressed and end when the second operation key 212b is released.

Third Embodiment

The following describes an image forming apparatus 100 according to a third embodiment with reference to FIGS. 1 to 7 and 11. The third embodiment differs from the first and second embodiments in that the action mode of the image forming apparatus 100 (post-processing device 2) is a second maintenance mode. In the following, points of difference between the third embodiment and the first and second embodiments are described, and description of elements that the embodiments share is omitted.

According to the present embodiment, a maintenance mode includes the second maintenance mode. The second maintenance mode is a mode for a worker to examine whether or not a detection result for each of a plurality of sensors 4 is normal.

A second controller 29 changes information notified of by a notification section 211 upon the operation mode of the image forming apparatus 100 switching to the second maintenance mode. According to the present embodiment, the second controller 29 causes the notification section 211 to notify of a detection result of a test target sensor 4 among the sensors 4. In the following, the test target sensor 4 is referred to as a "target sensor 4". The notification section 211 notifies of the detection result of the test target sensor 4 by combining states of a plurality of lamps.

FIG. 11 is a diagram illustrating a relationship between states of the notification section 211 and the sensors 4 according to the third embodiment. Each circle shown in FIG. 11 indicates that a lamp is illuminated. "(1)" indicates that a lamp blinks once. "(2)" indicates that a lamp blinks twice.

A state of the notification section 211 is preset for a case where any of the sensors 4 has detected a detection object (for example, the sensor 4 is shielded in a case of a thru-beam sensor). When any of the sensors 4 has detected the detection object, a first lamp 211a, a second lamp 211b, a third lamp 211c, and a fourth lamp 211d are each preset to be either illuminated, unilluminated, or blinking as illustrated in FIG. 11.

In the example illustrated in FIG. 11, the notification section 211 is set so as to divide (group) the sensors 4 into sensor groups for notification.

The sensor groups include a first group, a second group, a third group, and a fourth group. At least one sensor 4 is assigned to each of the first through fourth groups.

In the example illustrated in FIG. 11, first through sixth sensors are assigned to the first group. Seventh through thirteenth sensors are assigned to the second group. Fourteenth through nineteenth sensors are assigned to the third group. Twentieth through twenty-fifth sensors are assigned to the fourth group.

According to the present embodiment, the first sensor, the second sensor, the third sensor, the fourth sensor, the fifth sensor, and the sixth sensor of the first group are respectively as follows: an "intake sensor", an "intermediate sensor", an "ejected sheet sensor", a "first width matching sensor", a "second width matching sensor", and an "alignment sensor". The intake sensor detects presence of a sheet S in an intake section 24. The intermediate sensor and the ejected sheet sensor detect presence of a sheet S in a post-processing conveyance path L. The first width matching sensor and the second width matching sensor detect an alignment plate in an alignment plate home position with respect to a front-back direction. That is, the first width matching sensor and the second width matching sensor detect that the alignment plate is in the home position thereof with respect to the front-back direction. The alignment sensor detects a notification guide in a home position of the notification guide. That is, the alignment sensor detects that the notification guide is in the home position.

The seventh sensor, the eighth sensor, the ninth sensor, the tenth sensor, the eleventh sensor, the twelfth sensor, and the thirteenth sensor of the second group are respectively as follows: a "sheaf ejection sensor", a "paddle sensor", a "first exit tray sensor", a "second exit tray sensor", a "third exit tray sensor", a "fourth exit tray sensor", and a "fifth exit tray sensor". The sheaf ejection sensor detects a position of a sheaf ejection unit. The paddle sensor detects a paddle in a home position of the paddle. That is, the paddle sensor detects whether or not the position of the paddle is the home position. The first through fifth exit tray sensors detect a second exit tray 272 in a home position, an intermediate position, and a lower limit position of the second exit tray 272. That is, the first through fifth exit tray sensors detect whether the second exit tray 272 is in the home position, the intermediate position, or the lower limit position of the second exit tray 272.

The fourteenth sensor, the fifteenth sensor, the sixteenth sensor, the seventeenth sensor, the eighteenth sensor, and the nineteenth sensor of the third group are respectively as follows: a "first tray upper surface sensor", a "second tray upper surface sensor", a "shifting set sensor", a "shifting release sensor", a "first shifting sensor", and a "second shifting sensor". The first tray upper surface sensor and the second tray upper surface sensor detect a sheet S (upper surface) loaded on a main tray. The shifting set sensor detects a shifting guide in a home position of the shifting guide. That is, the shifting set sensor detects whether or not the position of the shifting guide is the home position. The shifting release sensor detects the shifting guide in a release position of the shifting guide. That is, the shifting release sensor detects whether or not the shifting guide is in the release position. The first shifting sensor and the second shifting sensor detect a shifting plate in a home position of the shifting plate with respect to the front-back direction. That is, the first shifting sensor and the second shifting sensor detect whether or not the position of the shifting plate is the home position with respect to the front-back direction.

The twentieth sensor, the twenty-first sensor, the twenty-second sensor, the twenty-third sensor, the twenty-fourth sensor, and the twenty-fifth sensor of the fourth group are respectively as follows: a "slide sensor", a "sub-ejection sensor", a "sub-tray full sensor", a "drum sensor", a "first cover opening and closing detection sensor", and a "second cover opening and closing sensor". The slide sensor detects a slide position of a stapling unit. The sub-ejection sensor detects a sheet S in a sub-tray. That is, the sub-ejection sensor detects a sheet S ejected to the sub-tray. The sub-tray full sensor detects whether the sub-tray is full of ejected sheets S. The drum sensor detects a sheet S in a holding conveyance path L5. The first cover opening and closing detection sensor is a sensor included in an opening and closing detection section 23. The first cover opening and closing detection sensor detects opening and closing of a cover member 22. The second cover opening and closing sensor detects opening and closing of a cover member (for example, a cover member provided adjacent to a first exit tray 271) which differs from the cover member 22.

As illustrated in FIG. 11, the fourth lamp 211d (refer to FIG. 7) notifies of a sensor group to which the target sensor 4 is assigned. The worker can switch the sensor group by pressing a second operation key 212b. According to the present embodiment, the second controller 29 switches the sensor group each time a second key press signal is received in the following order: the first group, the second group, the third group, the fourth group, and then the first group once more. The fourth lamp 211d changes states according to switching of the sensor group.

For example, the notification section 211 notifies of a detection result of any of the sensors 4 assigned to the first group (first through sixth sensors) when the fourth lamp 211d is unilluminated. Specifically, only the third lamp 211c is illuminated when the first sensor included in the first group detects the detection object.

The notification section 211 notifies of a detection result of any of the sensors 4 assigned to the second group (seventh through thirteenth sensors) when the fourth lamp 211d is illuminated. For example, the third lamp 211c and the fourth lamp 211d are illuminated when the seventh sensor included in the second group detects the detection object.

The notification section 211 notifies of a detection result of any of the sensors 4 assigned to the third group (fourteenth through nineteenth sensors) when the fourth lamp 211d blinks once. For example, the third lamp 211c is illuminated and the fourth lamp 211d blinks once when the fourteenth sensor included in the third group detects the detection object.

The notification section 211 notifies of a detection result of any of the sensors 4 assigned to the fourth group (twentieth through twenty-fifth sensors) when the fourth lamp 211d blinks twice. For example, the third lamp 211c is illuminated and the fourth lamp 211d blinks twice when the twentieth sensor included in the fourth group detects the detection object.

The worker examines whether or not the detection result of each of the sensors 4 is normal according to whether or not the state of the notification section 211 enters a preset state (illuminated, blinking, or unilluminated) when each sensor 4 has detected the detection object.

The third embodiment is described above. In a configuration in which the detection result of each of the sensors 4 is for example displayed on a touch display 111 (main body 1), the worker cannot confirm the results displayed on the touch display 111 while causing the sensors 4 included in the post-processing device 2 to detect (shielding the sensors 4, for example) in a case where the main body 1 and the post-processing device 2 are located apart from each other. In this case, maintenance work is performed by two people: a worker confirming the results displayed on the touch display 111 and a worker causing each of the sensors 4 to detect. According to the present embodiment, the notification section 211 notifies of the detection result of each of the sensors 4. The notification section 211 is located on a second casing 20. Accordingly, the work of causing the sensors 4 to detect and the work of confirming the detection result of each of the sensors 4 can be performed by a single worker. Therefore, a cost needed for the maintenance work can be reduced.

According to the present embodiment, the fourth lamp 211d notifies of the sensor groups (first through fourth groups) to which the sensors 4 of which detection results are notified are assigned. As such, the notification section 211 can notify of the detection results of the sensors 4 with a number of lamps that is smaller than the number of the sensors 4. Therefore, the number of lamps included in the post-processing device 2 can be reduced. As a result, the image forming apparatus 100 can have a simplified apparatus configuration.

According to the present embodiment, an example is described in which the fourth lamp 211d notifies of the sensor groups. However, a lamp that notifies of the sensor groups is not limited to the fourth lamp 211d. The lamp that notifies of the sensor groups may be any lamp included in the notification section 211, and may be the first lamp 211a, for example.

According to the present embodiment, the notification section 211 is described as including four lamps. However, the number of lamps included in the notification section 211 may be any number of lamps smaller than the number of the sensors 4, and may be 2 to 3 or 5 or greater, for example.

Fourth Embodiment

The following describes an image forming apparatus 100 according to a fourth embodiment with reference to FIGS. 1 to 7, 12, and 13. The fourth embodiment differs from the first through third embodiments in that an action mode of the image forming apparatus 100 is a third maintenance mode. In the following, points of difference between the fourth embodiment and the first through third embodiments are described, and description of elements that the embodiments share is omitted.

According to the present embodiment, a maintenance mode includes the third maintenance mode. The third maintenance mode is a mode in which a worker adjusts a setting value of a target adjustment item 6. The target adjustment item 6 is an adjustment item 6 among a plurality of adjustment items 6 described with reference to FIG. 5 that is a target for the worker to adjust the setting value.

A second controller 29 changes information notified of by a notification section 211 when the action mode of the image forming apparatus 100 switches to the third maintenance mode. According to the present embodiment, the notification section 211 changes information notified of by switching to one of the following notification modes: a first notification mode, a second notification mode, and a third notification mode. In detail, the notification section 211 notifies of target item information in the first notification mode. The notification section 211 notifies of candidate setting information in the second notification mode. The notification section 211 notifies of setting information in the third notification mode.

The target item information indicates the target adjustment item 6 and a candidate for the target adjustment item 6. The candidate setting information indicates a candidate for a setting value which may be set (registered) as the setting value of the target adjustment item 6. The setting information indicates a value currently set (stored in second storage 28) as the setting value of the target adjustment item 6.

A state of the notification section 211 is associated with each of the adjustment items 6 and prestored in the second storage 28. In detail, the notification section 211 notifies of the target adjustment item 6 and the candidate for the target adjustment item 6 by combining states of a first lamp 211a, a second lamp 211b, a third lamp 211c, and a fourth lamp 211d.

FIG. 12 is a diagram illustrating a relationship between states of the notification section 211 and the adjustment items 6 in the first notification mode according to the fourth embodiment. Note that each triangle shown in FIG. 12 indicates that a lamp is blinking (continuously blinking).

In the example illustrated in FIG. 12, the adjustment items 6 include first through tenth adjustment items. The first through tenth adjustment items are respectively as follows: a "punching resist loop amount", a "punching position in a conveyance direction of a sheet S", a "punching position in a left-right direction (direction orthogonal to the conveyance direction) of a sheet S", a "first holding conveyance timing", a "second holding conveyance timing", a "front width matching position", a "back width matching position", an "ejection cursor front position", an "ejection cursor back position", and a "stapling position".

For example, the notification section 211 notifies that the tenth adjustment item (stapling position) is specified as the candidate for the target adjustment item 6 when the first lamp 211a and the third lamp 211c are blinking. The worker can adjust a setting value of the stapling position upon specifying the tenth adjustment item as the target adjustment item 6.

The worker can change the candidate for the target adjustment item 6 by operating a second operation key 212b (refer to FIG. 7). According to the present embodiment, the worker can switch the target adjustment item 6 by long-pressing (continually pressing) the second operation key 212b. In detail, the second controller 29 receives a second key press signal continuing for a predetermined period or longer when the worker long-presses the second operation key 212b for the predetermined period or longer. Upon receiving the second key press signal continuing for the predetermined period or longer, the second controller 29 performs an adjustment item switching process. The adjustment item switching process means a process of sequentially switching the candidate for the target adjustment item 6. The candidate for the target adjustment item 6 is switched each time the predetermined period elapses. The predetermined period is one second, for example.

According to the present embodiment, the second controller 29 switches the candidate for the target adjustment item 6 each time the predetermined period elapses in the following order: the first adjustment item, the second adjustment item, the third adjustment item, the fourth adjustment item, the fifth adjustment item, the sixth adjustment item, the seventh adjustment item, the eighth adjustment item, the ninth adjustment item, the tenth adjustment item, and then the first adjustment item once more. The notification section 211 changes states when the candidate for the target adjustment item 6 switches. As a result, the candidate for the target adjustment item 6 notified of by the notification section 211 changes.

When a long-press operation of the second operation key 212b ends and the second key press signal is no longer received, the second controller 29 determines the candidate for the target adjustment item 6 specified when the long-press operation of the second operation key 212b ends to be the target adjustment item 6.

Upon determining the target adjustment item 6, the second controller 29 changes the notification mode of the notification section 211 from the first notification mode to the second notification mode. In detail, the second controller 29 causes the notification section 211 to notify of information (setting information) indicating the current setting value (setting value stored in the second storage 28) of the target adjustment item 6.

When a first operation key 212a is pressed while the notification section 211 is notifying of the setting information (in the second notification mode), the second controller 29 performs a candidate setting value switching process. The candidate setting value switching process means a process of switching a candidate setting value. Upon receiving a first key press signal, the second controller 29 performs the candidate setting value switching process.

According to the present embodiment, the candidate setting value includes a candidate lower limit setting value and a candidate upper limit setting value. The candidate lower limit setting value is "−15 mm", for example. The candidate upper limit setting value is "+15 mm", for example. The second controller 29 changes the candidate setting value to a value within a range from the candidate lower limit value to or the candidate upper limit value each time the first key press signal is received. In detail, the second controller 29 changes the candidate setting value by adding a change amount to the candidate setting value. The change amount is "0.32 mm", for example. The second controller 29 repeats a process of adding a predetermined change amount from the candidate lower limit setting value upon the candidate setting value exceeding the candidate upper limit setting value.

The notification section 211 changes states according to switching of the candidate setting value by the second controller 29. In detail, the notification section 211 changes the candidate setting value to be notified of according to the switching of the candidate setting value. The state of the notification section 211 is associated with the candidate setting value and prestored in the second storage 28. In detail, the notification section 211 notifies of the candidate setting value by combining states of the first lamp 211a, the second lamp 211b, the third lamp 211c, and the fourth lamp 211d.

While the notification section 211 is notifying of the candidate setting information, the second controller 29 performs a setting value registration process when the second operation key 212b is single-pressed. The setting value registration process means a process of registering (storing in the second storage 28) the candidate setting value specified by the second controller 29 (candidate setting value currently notified of by the notification section 211) as the setting value.

FIG. 13 is a diagram illustrating processes assigned to the first operation key 212a and the second operation key 212b according to the fourth embodiment.

When the action mode switches to the third maintenance mode, the processes assigned to the first operation key 212a and the second operation key 212b change. According to the present embodiment, processes required in the third maintenance mode are assigned to the first operation key 212a and the second operation key 212b.

As illustrated in FIG. 13, the adjustment item switching process is assigned to the long-press operation of the second operation key 212b when the action mode of the image forming apparatus 100 is the third maintenance mode. The candidate setting value switching process is assigned to a single-press operation of the first operation key 212a while the notification section 211 is notifying of the setting information. Furthermore, the setting value registration process is assigned to a single-press operation of the second operation key 212b while the notification section 211 is notifying of the candidate setting value.

The fourth embodiment is described above. According to the present embodiment, a user can change the setting values of the adjustment items 6 merely by operating the first operation key 212a and the second operation key 212b and need not operate a first operation panel 11. Therefore, the user need not travel back and forth between the first operation panel 11 and a second operation panel 21. Thus, work efficiency increases.

According to the present embodiment, an example is described in which the candidate for the target adjustment item 6 switches while the second operation key 212b is long-pressed. However, the candidate for the target adjustment item 6 may switch each time the second operation key 212b is single-pressed.

The embodiments of the present disclosure are described above with reference to the accompanying drawings (FIGS. 1 to 13). However, the present disclosure is not limited to the above embodiments and can be practiced in various ways within the scope not departing from the gist of the present disclosure. Furthermore, the configurations and numeric values illustrated in the above embodiments constitute one example and are not particularly limited. Various alterations are possible within a scope not substantially departing from the effects of the present disclosure.

For example, according to the embodiments of the present disclosure, an example is described in which the present disclosure is applied to an electrographic image forming apparatus 100. However, the present disclosure may also be applied to an inkjet image forming apparatus, for example.

Also according to the embodiments of the present disclosure, the processes assigned to the first operation key 212a and the second operation key 212b are interchangeable.

Also according to the embodiments of the present disclosure, a configuration is described in which the operation key section 212 includes the first operation key 212a and the second operation key 212b. However, the operation key section 212 may include only one of the first operation key 212a and the second operation key 212b. When including only one of the first operation key 212a and the second operation key 212b, the process to be performed may be switched by changing the operation of the operation key section 212 (for example, the long-press operation and the single-press operation).

Also, the elements described in each of the first through fourth embodiments may be appropriately combined. For example, the elements described in the third embodiment may be combined with the elements described in the fourth embodiment.

What is claimed is:

1. An image forming apparatus comprising:
a main body; and
a post-processing device connected to the main body, wherein
the main body includes:
an operation panel configured to receive an operation by a user; and
a first controller configured to switch an action mode to either a first action mode or a second action mode differing from the first action mode,
the post-processing device includes:
a casing;
a post-processing section configured to perform post-processing on a sheet;
an operation receiving section located on the casing and configured to output an operation signal indicating an operation by the user; and
a second controller configured to control action of the post-processing device based on control by the first controller in the first action mode,
the operation receiving section is in an unreachable position for the user when operating the operation panel,
the second controller transmits the operation signal to the first controller upon receiving the operation signal,
the first controller determines whether or not the operation indicated by the operation signal matches a predetermined operation,
the first controller switches the action mode upon determining that the operation indicated by the operation signal matches the predetermined operation, and
the second controller controls action of the post-processing device independent of the control by the first controller in the second action mode.

2. The image forming apparatus according to claim 1, wherein
the operation receiving section includes:
an operation key section configured to be pressed by the user; and
an opening and closing detection section configured to detect whether a cover member is in an open posture or a closed posture, the cover member being supported by the casing so as to freely open and close, and
the predetermined operation includes an operation in which the cover member is opened and closed while the operation key section is continuously pressed.

3. The image forming apparatus according to claim 2, wherein
a process to be performed when the operation key section is pressed changes according to the action mode.

4. The image forming apparatus according to claim 3, wherein
the post-processing device further includes a driving section configured to drive the post-processing section,
the operation key section includes a first operation key,
the second controller, upon receiving a first key press signal indicating that the first operation key is pressed, transmits the first key press signal to the first controller when the action mode is the first action mode, the first controller causes the post-processing section to perform the post-processing through the second controller upon receiving the first key press signal, and the second controller causes the driving section to test drive upon receiving the first key press signal when the action mode is the second action mode.

5. The image forming apparatus according to claim 4, wherein the operation key section further includes a second operation key which differs from the first operation key, the second controller, upon receiving a second key press signal indicating that the second operation key is pressed, transmits the second key press signal to the first controller when the action mode is the first action mode, the first controller switches a setting related to the post-processing upon receiving the second key press signal, and the second controller switches a target of test driving from the driving section to another driving section included in the post-processing device upon receiving the second key press signal when the action mode is the second action mode.

6. The image forming apparatus according to claim 1, wherein the operation receiving section includes a notification section configured to notify of information related to the post-processing device, and the notification section changes the information to be notified of according to the action mode.

7. The image forming apparatus according to claim 6, wherein the post-processing device further includes a sensor configured to detect a detection object, and the notification section notifies of setting information related to the post-processing when the action mode is the first action mode, and notifies of a detection result of the sensor when the action mode is the second action mode.

8. The image forming apparatus according to claim 7, wherein the notification section includes a plurality of lamps, and the notification section combines states of the plurality of lamps to notify of the detection result.

9. The image forming apparatus according to claim 8, wherein the post-processing device includes a plurality of sensors each as the sensor, and at least one of the plurality of lamps notifies of a group to which a target sensor is assigned, the target sensor being one of the plurality of sensors that is a target of which the detection result is notified.

10. The image forming apparatus according to claim 9, wherein the operation receiving section includes an operation key section configured to be pressed by the user, and the second controller, upon the user pressing the operation key section, switches the target sensor indicating the target of which the detection result is notified when the action mode is the second action mode.

11. The image forming apparatus according to claim 8, wherein the post-processing device further includes storage storing therein setting values respectively corresponding to a plurality of adjustment items related to the post-processing, and the notification section notifies of a candidate for a target adjustment item by combining the states of the plurality of lamps, the target adjustment item being a target for which the setting value is changed.

12. The image forming apparatus according to claim 11, wherein the notification section notifies of the setting value of the target adjustment item by combining the states of the plurality of lamps.

13. The image forming apparatus according to claim 11, wherein the operation receiving section includes an operation key section configured to be pressed by the user, the operation key section includes a first operation key and a second operation key which differs from the first operation key, the second controller, upon receiving a first key press signal indicating that the first operation key is pressed, switches a candidate setting value indicating a candidate to be set as the setting value when the action mode is the second action mode, and the second controller, upon receiving a second key press signal indicating that the second operation key is pressed, stores the candidate setting value in the storage as the setting value when the action mode is the second action mode.

14. The image forming apparatus according to claim 13, wherein the second controller, upon continuously receiving the first key press signal for a predetermined period or longer, sequentially switches the candidate for the target adjustment item each time the predetermined period elapses when the action mode is the second action mode.

* * * * *